United States Patent [19]
Barnes et al.

[11] Patent Number: 4,605,729
[45] Date of Patent: Aug. 12, 1986

[54] PROCESS FOR THE PRODUCTION OF POLYETHERESTER POLYOLS AND THE PRODUCTS AND USE THEREOF

[75] Inventors: James M. Barnes, Wermelskirchen; Werner Betz, Odenthal, both of Fed. Rep. of Germany

[73] Assignee: Bayer Aktiengesellschaft, Leverkusen, Fed. Rep. of Germany

[21] Appl. No.: 784,071

[22] Filed: Oct. 4, 1985

[30] Foreign Application Priority Data

Oct. 17, 1984 [DE] Fed. Rep. of Germany ....... 3437915

[51] Int. Cl.⁴ ............................................. C08G 63/66
[52] U.S. Cl. ....................................... 528/301; 528/44; 528/272; 528/296; 528/302
[58] Field of Search ................. 528/44, 272, 296, 301; 528/302

[56] References Cited

U.S. PATENT DOCUMENTS

| | | | |
|---|---|---|---|
| 3,684,770 | 8/1972 | Meisert et al. | 260/75 |
| 4,241,199 | 12/1980 | Dunleavy | 528/301 X |
| 4,307,224 | 12/1981 | Rogier | 528/296 X |
| 4,349,662 | 9/1982 | Bernstein et al. | 528/301 |
| 4,400,477 | 8/1983 | Blanpied | 528/296 X |
| 4,452,997 | 6/1984 | Marx et al. | 560/200 |
| 4,525,575 | 6/1985 | Yeater | 528/301 |
| 4,559,370 | 12/1985 | Blanpied | 528/296 X |

FOREIGN PATENT DOCUMENTS

| | | |
|---|---|---|
| 2057884 | 6/1971 | Fed. Rep. of Germany . |
| 2110278 | 7/1972 | Fed. Rep. of Germany . |
| 113923 | 7/1975 | German Democratic Rep. . |
| 1402610 | 8/1975 | United Kingdom . |

Primary Examiner—Lucille M. Phynes
Attorney, Agent, or Firm—Gene Harsh; Joseph C. Gil

[57] ABSTRACT

The invention provides a process for the production of polyetherester polyols which have hydroxyester groups terminally bound via ester groups to high molecular weight polyether polyol segments. These are produced by first reacting high molecular weight polyoxyalkylene ether polyols with molecular weights of from about 400 to 10,000 with an excess of dicarboxylic acids, dicarboxylic acid anhydrides or dicarboxylic acid esters, and then reacting the intermediate product in a further stage with an excess of diols, based on carboxyl groups.

The new, high molecular weight polyetherester polyols thus consist of polyoxyalkylene ether segments, which have terminal ester segments in each case with terminal hydroxyl groups per end group.

Moreover, the use is claimed of the high molecular weight polyetherester polyols as polyhydroxyl compounds for forming polyurethanes.

13 Claims, No Drawings

PROCESS FOR THE PRODUCTION OF POLYETHERESTER POLYOLS AND THE PRODUCTS AND USE THEREOF

BACKGROUND OF THE INVENTION

The present invention provides a process for the production of polyetherester polyols which have hydroxyester groups terminally bound via ester groups to high molecular weight polyether polyol segments. They are produced by first reacting high molecular weight polyoxyalkylene ether polyols (with molecular weights of from about 400 to 10,000, preferably high molecular weight polyoxy-$C_2/C_3$-alkylene ether polyols, and in particular polyoxypropylene ether polyols), with an excess of dicarboxylic acids, dicarboxylic acid anhydrides and/or dicarboxylic acid esters, and reacting the resultant product with an excess of diols to form a polyetherester polyol.

The new, high molecular weight polyetherester polyols thus consist of polyoxyalkylene ether segments.

Moreover, the invention is also directed to the use of the high molecular weight polyetherester polyols in forming polyurethanes, in particular polyurethane elastomers, by using usual further polyurethane starting materials (for example, polyisocyanates and chain extending agents).

Polyether polyols and polyester polyols often cannot be mixed homogeneously with each other and thus can only be used with difficulty as a mixture for polyurethane syntheses.

It has already been attempted according to German Pat. No. 1,940,181 to bind polyether polyols to polyester polyols via diisocyanates, during which polyether-NCO-prepolymers were produced from the polyether diol and excess diisocyanates and these were reacted to form the polyurethane with a polyester diol and optionally other diols.

Another method was proposed in German Offenlegungsschrift No. 2,164,309, in which a polyester containing —$CH_2$—$CH.R'$—OH-end group ($R'$=H or $C_1$-$C_6$-alkyl) is heated to high temperatures in the presence of an etherification catalyst, such as $H_2SO_4$, whereby an etherification is produced via the terminal hydroxyl groups.

In East German Pat. No. 113,923, polycarboxylic acids are reacted with alkylene oxides in one stage or polycarboxylic acids are reacted with polyether polyols. Also described is a process wherein polyols are first etherified at high temperatures under sulphuric acid catalysis. The resulting mixture is then esterified with dicarboxylic acid (anhydrides). High functional alcohols or carboxylic acids such as glycerin, hexantriol, trimethylol propane, sorbitol, pentaerythrite or benzene tricarboxylic acids are optionally added after etherification to compensate for functionality losses.

According to German Offenlegungsschriften Nos. 2,057,884 and 2,110,278, polyols are produced from polyoxyalkylene polyols, a dibasic carboxylic acid anhydride and an oxiran compound at temperatures of from about 70° to 200° C. and under pressures of up to 3.0 atmospheres excess pressure in a one-stage reaction. Corresponding catalysts must be simultaneously used for reacting the alkylene oxides. By means of this reaction however, no terminal hydroxyester-segmented polyetherester polyols with the desired properties can be formed. Moreover, in most cases the simultaneously used catalysts interfere.

In German Offenlegungsschrift No. 3,201,203, a high molecular weight polyether polyol is reacted with at least one carboxylic acid anhydride (preferably glutaric acid anhydride) to form a carboxylic acid semiester. This semiester is then oxalkylated with at least one alkylene oxide (preferably ethylene oxide) in the presence of at least one thio-dialkylene glycol. This process also necessitates a pressure-oxalkylation reaction and the simultaneous use of interfering thiodihydroxy compounds which have a very unpleasant odor.

According to the present invention, polyetherester polyols are produced according to simple esterification processes and from starting materials which are simple to handle. The resultant polyetherester polyols contain defined hydroxyester segments, which are bound via a further ester group to the polyether polyol. The polyetherester polyols according to the invention are preferably liquid and have a high reactivity (from preferably primary hydroxyl terminal groups) in relation to isocyanates. Moreover, they are free from interfering catalyst residues which show an uncontrolled formation reaction during use as high molecular weight polyhydroxyl compound in the formation of polyurethane plastics materials.

DESCRIPTION OF THE INVENTION

The present invention thus provides a process for the production of polyetherester polyols from preformed polyether polyols and ester-forming components comprising (A) reacting
(1) at least one high molecular weight polyoxyalkylene ether polyol with a molecular weight of from 400 to 10,000 (preferably from 600 to 6000 and most preferably from 800 to 4500) with
(2) at least one member selected from the group consisting of
 (i) dicarboxylic acids,
 (ii) di-$C_1$–$C_4$ alkyl ester of said acids,
 (iii) anhydrides of said acids, and
 (iv) mixtures thereof,
(3) optionally with up to 10 equivalent % of the carboxyl groups in (2) of an additional acid component selected from the groups consisting of (a) tricarboxylic acids, (b) alkylesters of said tricarboxylic acids, (c) anhydrides of said tricarboxylic acids, (d) monocarboxylic acids, and (e) alkylesters of said monocarboxylic acids,
(4) optionally in the presence of esterification catalysts
at a molar ratio of carboxyl resp. anhydride groups to hydroxyl groups of from (1.4)/n:1 to 8/n :1 when n=1 for the acids and acid esters and n=2 for the anhydrides, at elevated temperatures (preferably from 130° to 240° C. and most preferably from 150° to 210° C.) to form a carboxyl functional material and (B) reacting the product of step (A) with
(5) aliphatic and/or cycloaliphatic diols with molecular weights of from 62 to 399 (preferably from 62 to 254, in particular diprimary aliphatic diols),
(6) optional triols or polyols in minor quantities, preferably up to 10 OH equivalent % based on (5), and
(7) optional esterification catalyst (preferably tin-II-chloride),
at a hydroxyl to carboxyl equivalent ratio of at least 1.6:1 (preferably 1.6 to 3:1 and most preferably from 2 to 2.4:1 equivalents), at elevated temperatures (preferably from 130° to 240° C., in particular from 150° to 210° C.). In step (B), one carboxylic acid alkylester represents one equivalent.

The invention further provides polyetherester polyols, preferably polyetherester diols with terminal hydroxyester segments, which are bound by means of a further ester group to the polyether polyol segments, obtained according to the above-described process.

A further object of the invention is the use of the polyetherester polyols according to the described processes in the production of optionally foamed or cellular polyurethanes according to the polyisocyanate polyaddition process comprising reacting (a) the polyols of the present invention,
(b) polyisocyanates,
(c) optional chain lengthening agents or cross-linking agents and
(d) optional usual auxiliaries and additives.

For the production of the polyether polyester polyols, the polyoxyalkylene ester polyols (1) preferably have from 2 to 4 carbon atoms in the oxyalkylene radical. Suitable polyoxyalkylene ether polyols include, for example, polyoxyethylene polyols, polyoxypropylene polyols, polyoxytetramethylene polyols or polyepichlorohydrin polyols. Those with $C_2$- and/or $C_3$- oxyalkylene radicals are preferably used. Particularly preferred are polyoxyalkylene diols. Polyoxypropylene polyols (particularly -diols) are particularly preferred, which contain up to 40% by weight, and in particular up to 10% by weight of oxyethylene groups in place of oxypropylene groups.

The polyoxyalkylene polyols are produced according to usual, well-known processes, for example by addition of alkylene oxides such as ethylene oxide, propylene oxide, epichlorohydrin or epoxybutanes, to starter compounds such as water, di- and/or polyols, mono-, di- and/or polyamines and the like. They may also be produced by polymerization of tetrahydrofuran by means of strong acids such as fluorosulphonic acid. When using several alkylene oxides, these can be incorporated in the ethers simultaneously or sequentially. The molecular weights of these polyether polyols can be from 400 to 10,000, preferably from 600 to 6000, in particular from 800 to 4500. The OH numbers of such polyethers are generally from 280 to 11.4, preferably from 187 to 18.7, and most preferably from 140 to 24.9.

Aliphatic, cycloaliphatic or aromatic dicarboxylic acids are also used in step (A). Also useful are the derivatives thereof such as dicarboxylic acid alkyl esters or dicarboxylic acid anhydrides. Examples of useful carboxyl functional materials include oxalic acid, glutaric acid, adipic acid, pimelic acid, suberic acid, sebacic acid, lauric acid, the cyclohexane-1,3- or 1,4-dicarboxylic acids, hexachloroendomethylenetetrahydrophthalic acid, phthalic acid, dimethylphthalic acid, tetrachloroterephthalic acid, and isophthalic acid.

The aliphatic and cycloaliphatic dicarboxylic acids having $\geq 6$ carbon atoms are preferred, for example, adipic acid, sebacic acid, lauric acid, the cyclohexane-1,3- or cyclohexane-1,4-dicarboxylic acid. Also preferred are phthalic acid and isophthalic acid.

With the exception of phthalic acid and glutaric acid, the acids are preferably used in the form of the free dicarboxylic acids.

It is also possible, but not preferred, to use dicarboxylic acid dialkylesters, preferably those having from 1 to 4 carbon atoms in the alkyl radical, and most preferably methyl esters.

To compensate for functionality defects (often the functionality f of high molecular weight "diols" is not exactly f=2, but lies below this, for example at from 1.98 to 1.93, f often decreasing with increasing molecular weight) small quantities of tri- or polycarboxylic acids can be simultaneously used in the first esterification stage (A) (or also tri- or polyols in the second esterification stage (B)).

By increasing the quantity of polyfunctional carboxylic acids or polyols, the functionality can also be raised above the (nominal) functionality of the polyether polyols (I).

Aliphatic or cycloaliphatic polyols (i.e., those which contain the hydroxyl group bound to an aliphatic or cycloaliphatic carbon atom) with molecular weights of from 62 to about 399 are used as diols. Examples include ethylene glycol, propylene glycol, propan-1,3-diol, butan-1,4, -2,3 or -1,3-diol, hexan-1,6-diol, 2,(3)-methyl hexan-1,6-diol, dodecan-1,12-diol, decan-1,10-diol, 1,3- or 1,4-cyclohexandiol, 1,3- or 1,4-xylylene glycol, 1,3- or 1,4-dimethylol cyclohexane, neopentyl glycol, chlorinated or brominated diols, for example, 2,3-dichlorobutan-1,4-diol. Tri- or polyols can be simultaneously used, preferably in minor quantities of up to 10 mol %. Examples are trimethylol propane, glycerin, tetrites, hexites, pentaerythrite and similar compounds.

In the first esterification stage (A), the polyether polyols are esterified for several hours in a usual manner with the dicarboxylic acids (or the -esters or -anhydrides thereof) in the melt, preferably at temperatures of from 130° to 240° C., in particular from 150° to 210° C., whereby the water or the alcohol resulting from the esterification reaction is distilled off. Towards the end of the reaction, a vacuum can be applied.

In this first esterification stage, the carboxylic acids are generally active in a sufficiently catalyzing manner so that an addition of esterification catalysts is in most cases not necessary. Esterification catalysts can, however, be used. Suitable catalysts are, for example, the catalysts named below by way of example for the second esterification stage.

The reaction in the first stage is generally conducted until the OH number in the intermediate product with terminal carboxyl groups is below 5, generally below 2. For the production of the polyetherester polyols according to the invention, in the first stage $\geq 0.7$ mol and up to 4 mol of dicarboxylic acids, dicarboxylic acid alkyl esters or dicarboxylic acid anhydrides are used per hydroxy terminal group in the polyether polyol. This corresponds to an equivalent ratio of 1.4 and up to 8 equivalents of carboxyl- or carboxylic acid alkyl esters or (1.4)/2 (0.7) to 8/2 (=4) equivalents of

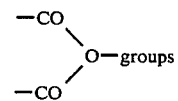

per hydroxyl group in the polyether polyol.

With less than equivalent quantities of dicarboxylic acid, that is <1 mol of dicarboxylic acid or the derivatives thereof or <2 equivalents of carboxyl group per hydroxyl terminal group, either high molecular weight polyester carboxylic acids are formed or free polyether polyols remain unmodified. Thus, less than 0.7 mol of dicarboxylic acids or the derivatives thereof is in most cases insufficient, and correspondingly produce no or too low effects when such mixtures are used for the formation of polyurethanes.

From 1 to 4 mol of dicarboxylic acids and the derivatives thereof per hydroxyl group of the polyether (that is from 2 to 8 equivalents of —COOH or —COOR'—) or from 1 to 4 equivalents of carboxylic acid anhydride groups are preferably used. For economic reasons, use is mainly restricted to from 1 to 2 mol of dicarboxylic acid and the derivatives thereof per hydroxyl group (that is from 2 to 4 equivalents of —COOH— or —COOR' or from 1 to 2 equivalents of carboxylic acid anhydride grouping). In the preferred embodiment, about 1 mol of dicarboxylic acid or the derivatives thereof per hydroxyl group of the polyether polyol, that is 2 equivalents of —COOH— or —COOR'— or 1 equivalent of carboxylic acid anhydride grouping is used.

In those cases in which more than 1 mol of dicarboxylic acid or the derivatives thereof per hydroxyl terminal group, are used in the polyether polyol, a corresponding quantity of dicarboxylic acid or the derivatives thereof are present in addition to the carboxyl terminal group-containing addition product according to stage (A).

The reactions of the esterification stage (A) are shown by way of example for a polyether diol, followed by the reaction in the esterification stage (B) (see formulae):

Esterification Stage A:

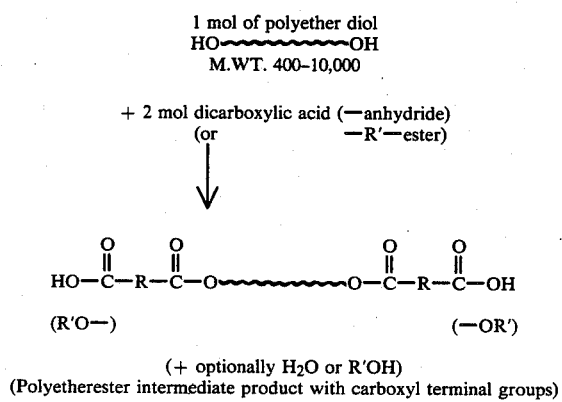

(+ optionally H₂O or R'OH)
(Polyetherester intermediate product with carboxyl terminal groups)

Esterification Stage B:

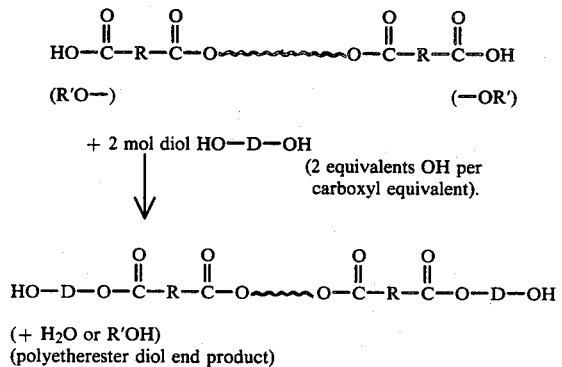

(+ H₂O or R'OH)
(polyetherester diol end product)

Naturally, due to secondary reactions which are unavoidable in a kinetic reaction, small quantities of the polyether diols are also only modified on an end group by esters, or small quantities of polyether polyols can also be bound by a dicarboxylic acid radical. In those cases in which more than 1 mol of dicarboxylic acid or the derivatives thereof per hydroxyl terminal group are used, for example in addition to the terminal ester group-modified compounds, polyester polyols of dicarboxylic acid and diols can form in small quantities which are not chemically bound to the polyether ester segments. Such secondary reactions are in principle known from esterification chemistry.

In the second reaction stage (B), the modified polyether polyols with terminal carboxyl and/or carboxylic ester groupings are further reacted to form the hydroxy ester terminal groups (see formula scheme (B)) with excess quantities of diols HO—D—OH.

Generally per equivalent of carboxyl- (or carboxylic ester-) groups ≧0.8 mol, preferably from 0.9 to 1.5 mol and most preferably about 1 mol (0.95 to 1.1 mol) of diol are used. This corresponds to a quantity of ≧1.6 equivalents of hydroxyl groups (substantially of diols), preferably 1.8 to 3 equivalents (in particular 1.9 to 2.2 equivalents) and most preferably about 2 equivalents per carboxyl equivalent.

With deficient quantities of diols a certain increase in the average molecular weight of the polyether ester polyols occurs, since two molecules of carboxyl functional material are bound via a diol, the molecular weight being approximately doubled. The increase in the average molecular weight in the end product is thus all the sharper, the more the value decreases. Thus, deficient quantities of diols are only used in special cases if the average molecular weight in the end product is to be increased.

On the other hand, excessive quantities of diols do not interfere. They are generally distilled off (mostly by applying a vacuum) for example during or after the esterification process (B). They can even remain as low molecular weight diol-chain lengthening agents in the polyether ester polyol system where they could be used in any case for the formation of polyurethanes.

For carrying out the second stage (B) of esterification, the carboxyl group-modified polyether ester polyols (and optionally excessive dicarboxylic acids) are esterified with the diols in the melt at elevated temperatures, mostly above 130° C., and up to about 240° C., preferably from 150° to 210° C. The esterification can be undertaken without catalysts, but the addition of esterification catalysts is recommended for shortening the reaction time. Preferred catalysts are zinc-, tin-, antimony-, germanium- or titanium catalysts, for example, zinc acetate, tin-(II)-chloride, tin diacetate, dibutyl-tin dilaurate, antimony trioxide, germanium dioxide, titanium tetrabutylate, titanium bisadipate and similar compounds in catalytic quantities (for example from 0.001 to 1% by weight). Tin-(II)-chloride is a preferred catalyst.

The esterification is generally carried out for about 2 to 12 hours at from 130° to 240° C., whereby water or R'OH is distilled off. Towards the end, a vacuum is usually applied, whereby possibly undesired diol- or polyol quantities may also be distilled off. The esterification reaction is generally conducted until the resulting polyester polyols have acid numbers below 3, and preferably below 1.5. The reaction can also be carried out under protective gas, for example, N₂ or CO₂.

The products obtained according to the described process preferably have an average molecular weight of from about 600 to 10,000, preferably from 750 to 6500 and in particular from 1000 to 5000.

They mostly represent liquid compounds which can be easily conveyed through metering devices, since at room temperature, their viscosity is lower than polyesters. Surprisingly, hardly any undesired transesterification occurs during production. When using diprimary diols (4), terminal primary hydroxyl groups are incorporated, which desirably increases the reactivity of the polyether esters (in comparison with polyether polyols with secondary OH groups). The observed, surprising improvements in the strength values, (in spite of the minor content of polyester segments), indicates a specific interaction of the hard segments (of diisocyanates and chain lengthening agents) with these high molecular weight polyether ester segments on the ester groups. The polyester polyols contain at least two ester groups per modified OH group of the polyether polyol (on average at most 8, preferably from 2 to 4, most particularly preferably 2 ester groups).

The polyetherester polyols for the production of optionally foamed or cellular polyurethanes according to the polyisocyanate polyaddition process are preferably used alone or in combination with the high molecular weight polyhydroxyl compounds. Preferably at least 50% by weight of the high molecular weight compounds with hydrogen atoms which are reactive in relation to NCO, consist of the polyetherester polyols of the invention.

The optionally simultaneously used, high molecular weight polyhydroxyl compounds and/or other high molecular weight compounds with hydrogen atoms which are reactive in relation to NCO, are the known high molecular weight, di- and/or higher functional, preferably di- to quadri-functional, and in particular difunctional compounds with reactive hydrogen atoms (for example, hydroxyl groups, primary and/or secondary amino groups, hydrazine and/or hydrazide terminal groups) with molecular weights of from about 400 to 10,000, preferably from 600 to 6000 and with melting points $\leq 60°$ C.

Particular examples include polyhydroxyl or polyamino compounds such as polyester polyols (including polylactonester polyols and polycarbonate polyols), polyether polyols, polyacetal polyols or corresponding polyester polyamines, polyether polyamines or polyether polyhydrazides. Examples are polyesters of dicarboxylic acids such as adipic acid and diols such as ethylene glycol, butan-1,4-diol, hexan-1,6-diol, neopentyl glycol or diol mixtures; polycaprolacton esters; hexandiol polycarbonates; polyethers such as $\alpha,\omega$-dihydroxypolyoxytetramethylene ethers or propylene oxide- and/or ethylene oxide addition products of diols or polyols or (di)amines or polyamines. Polyamines can also be obtained according to the process as described, for example, in German Offenlegungsschrift No. 3,131,252, by alkaline hydrolysis of NCO prepolymers or according to the prior art indicated therein.

Aliphatic, cycloaliphatic, araliphatic, aromatic or heterocyclic di- and/or polyisocyanates, preferably with molecular weights up to 500, can be used as polyisocyanates. Corresponding modification products of the polyisocyanates, for example by urethanization (with subequivalent quantities of di- or polyols), by urea formation, di- and/or trimerization, allophanatization, biuretization, carbodiimidization or di- and/or polyisocyanates modified according to other known processes, can also be used. Suitable examples for di- and polyisocyanates are further described in German Offenlegungsschriften Nos. 2,854,384 and 2,290,501.

The mixtures of di- and multinuclear polyisocyanates can in particular also be used as polyisocyanates, which mixtures represent phosgenation products of formaldehyde/aniline condensation products.

Diisocyanates such as naphthalene-1,5-diisocyanate, 4,4'- and/or 2,4'- and/or 2,2'-diphenylmethane diisocyanate, the isomeric toluylene diisocyanates, 4,4'-dimethyl-3,3'-diisocyanato diphenylurea, 3,3'-dimethyl-4,4'-diisocyanato diphenyl, $\alpha,\alpha,\alpha',\alpha'$-tetramethyl paraxylylene diisocyanate, 4,4'-diphenylethane diisocyanate, isophorone diisocyanate, 4,4'-dicyclohexylmethane diisocyanate or hexane-1,6-diisocyanate are preferred.

In addition to the high molecular weight compounds, low molecular weight compounds can also be used, with two or more (preferably from 2 to 4, and in particular with 2) hydrogen atoms which are reactive in relation to NCO and with molecular weights of 18, 32 and 60 up to about 399 (so-called chain lengthening agents or cross-linking agents) for the formation of polyurethanes. Examples include di- and/or polyols, aliphatic or aromatic di- and/or polyamines, amino alcohols, hydrazino alcohols, di- and polyhydrazides, amino hydrazides, aminosemicarbazides, amidines, guanidines or thiol compounds. Specific examples include water; hydrazine (hydrate); ethylene glycol; butandiol; neopentyl glycol; 1,4-dihydroxycyclohexane; hydroquinone-bis(-$\beta$-hydroxyethylether); N-methyl-bis-N,N-(2-hydroxy propyl)-amine; trimethylol propane, pentaerythrite; isosorbides such as 1,4-3,6-dianhydrosorbitol; aminoethanol, ethylene diamine; propylene diamine; piperazine; isophorone diamine; 3,3'-dimethyldicyclohexyl methane-4,4-diamine; 2-hydroxyethyl hydrazine; carbodihydrazine; $\beta$-semicarbazidopropionic acid hydrazide; 2-aminoacetic acid hydrazide; toluylene diamine; 4,4'- or 2,2'-diamino-diphenylmethane; and other conventional chain lengthening agents or cross-linking agents.

Small quantities of chain breakers (monofunctional alcohols, monoamines, monohydrazides, or the like) can be simultaneously used in minor quantities, likewise the conventional catalysts, additives and auxiliaries of polyurethane chemistry.

Suitable high molecular weight compounds, polyisocyanates, chain lengthening agents or cross-linking agents and examples of catalysts and additives are known and are described, for example, in German Offenlegungsschriften Nos. 2,637,115, 2,002,090, 2,920,501, 2,854,384, 3,111,093, 2,854,409, 2,302,564 and 2,854,408.

The reaction to form the polyurethane plastics materials can take place in the one-stage or preferably multistage process using NCO prepolymers.

The new polyetherester polyols are preferably used for the production of optionally cellular elastomers, coverings and coatings, fibers or for the production of semihard and hard foams with optionally integral skin according to the reaction injection process (RIM process).

The new polyetherester polyols have particularly good advantages in the production of elastomers based on naphthylene diisocyanate and with the simultaneous use of diols or diamines. A cellular structure of the elastomers with densities of from 200 to 800 kg per m$^3$ can optionally be achieved through the simultaneous use of water, in particular in the presence of silicone derivatives which lead to a fine cell structure. Such microcellular elastomers are particularly suitable as damping elements, for example in the construction of vehicles.

The particularly favorable and improved properties result from the low or lower glass transition temperature, a low-lying damping maximum, high tear propagation resistance and favorable modulus values at low and also at high test temperatures (110° C.). Further advantages can be seen in the examples and comparative examples.

Surprising advantages are likewise to be seen with thermoplastically processible polyurethane elastomers, for example based on 4,4'-diisocyanatodiphenylmethane and diol chain lengthening agents.

With ether ester diols, in which the polyether component is polytetrahydrofuran, the possibility has surprisingly been found of producing hard elastomers with very good cold properties (and improved transparency). With equal stiffness, the cold impact strength is about 50% higher than a pure $C_4$-ether type (see Example 5 and Comparative Example 5a). Compared with a $C_4$-ether/ester mixture, there are clear advantages with the polyetherester according to the invention, with respect to cold properties and to the resilience (see Comparative Example 5b).

Even with ether ester polyols, in which the ether component is polyoxypropylene polyol, substantial advantages are found in the cold impact resistance of the thermoplastic polyurethane elastomers produced therefrom. Mixtures of ether polyols and ester polyols are, however, clearly inferior (c.f. Examples 6 and 7 and Comparative Example 7a). Even in the dynamic properties (in particular resilience), the elastomers according to the invention show higher values.

The new polyetherester polyols are thus particularly suitable for the production of thermoplastic polyurethane elastomers. Polyether polyols are so far of only minor importance for the production of thermoplastically processible polyurethanes compared with polyester polyols, although they would offer a better raw material basis than polyester, especially for the synthesis of hydrolysis-resistant and microbe-resistant polyurethane elastomers with improved low temperature flexibility. This discrepancy is substantially based on the thermal instability in particular of $C_2/C_3$-polyether-based polyurethanes, which substantially restrict a thermoplastic processing, that is shaping in the melt.

As shown in the examples, thermoplastic polyurethanes based on the new polyols have a clearly higher thermal stability than the comparative examples based on a mixture of polyether polyols and polyester polyols in about equal weight ratios. In addition to the improved thermal stability, the polyurethanes according to the invention, based on the new polyether polyester polyols are characterized by improved processibility. The thermoplastic polyurethanes according to the invention moreover have improved low temperature properties, elevated elasticity and a lower shrinkage. They are particularly suitable for the production of cable casings, ski boot casings or external parts for automobiles.

The invention is further illustrated, but is not intended to be limited by the following examples in which all parts and percentages are by weight unless otherwise specified.

EXAMPLES

EXAMPLE 1

General Production Procedure for Polyetherester Polyols

Esterification Stage 1

2 mol of acid (A) and 1 mol of polypropylene diol (B) (see Table 1) are heated to about 200° C. in an apparatus consisting of a stirring vessel, a stirrer, a column and a cooler a receiver and a vacuum pump, and the reaction water is distilled off. (Reaction duration about 1 to 6 hours). The pressure is then reduced stepwise at the same temperature to a final pressure of about 20 mbars, the quantity of catalyst given in Table 1, is optionally added, and the condensation is conducted with separation of the residual water until the first esterification stage is completed (duration about 6 to 20 hours). The carboxy terminal group-containing polyetherester obtained in this manner thereafter has an OH number of $\geq 2$.

Esterification Stage 2

Thereafter 2 mol of diol (C) (see Table 1) are added, and water distilled off. 0.002% by weight of catalyst tin(II)chloride are optionally added and the pressure is reduced stepwise to about 20 mbars, until an acid number $\leq 1$ is obtained which in this case takes between 9 and 24 hours. Aeration is then carried out with nitrogen and cooling takes place. For product data see Table 1.

EXAMPLE 2

Esterification Stage 1

2.2 mol of phthalic acid anhydride and 1 mol of polypropylene diol (molecular weight 1000) are heated to 200° C. in a nitrogen atmosphere for 1–3 hours as described in Example 1 and kept at this temperature for a further 3 hours until an OH number of 1.1 and thus the completion of esterification stage 1 is achieved.

Esterification Stage 2

2.2 mol of propane-1,2-diol are added and the reaction water distilled off. After 7 hours at 200° C., 0.002% by weight of tin(II)chloride are added and the pressure is reduced to 30 mbar within 10 hours. After a further 12 hours under these conditions the condensation is completed. The product has an acid number of 0.9, an OH number of 78.4 and a viscosity of 177 mPas at 75° C. Aeration is then carried out with nitrogen and cooling takes place.

TABLE 1

| | Polyetherester polyols | | | | | | | |
|---|---|---|---|---|---|---|---|---|
| | Starting materials | | | | Product data for the polyester polyols | | | |
| Example No. | Acid Component (A) | Catalyst in stage 1 (%) | Polyoxypropylene diol (B) (molecular weight) | Diol Component (C) | Catalyst in stage 2 (%) | OH number | Acid number | Viscosity mPas/75° C. |
| 1.1 | adipic acid | — | 1000 | hexane-1,6-diol | — | 74.6 | 0.95 | 102 |
| 1.2 | adipic acid | 0.002 SnCl$_2$ | 2000 | hexane-1,6-diol | — | 44.8 | 0.24 | 168 |
| 1.3 | adipic acid | 0.002 SnCl$_2$ | 1000 | neopentyl glycol | — | 68.8 | 0.95 | 137 |
| 1.4 | azelaic acid | — | 1000 | hexane-1,6-diol | 0.002 SnCl$_2$ | 69.6 | 0.18 | 105 |
| 1.5 | lauric acid | 0.002 SnCl$_2$ | 1000 | hexane-1,6 diol | — | 70.8 | 0.51 | 130 |
| 1.6 | suberic acid | — | 2000 | butane-1,4-diol | 0.002 SnCl$_2$ | 42.2 | 0.55 | 208 |

TABLE 1-continued

| | Starting materials | | Polyetherester polyols | | Product data for the polyester polyols | | | |
|---|---|---|---|---|---|---|---|---|
| Example No. | Acid Component (A) | Catalyst in stage 1 (%) | Polyoxypropylene diol (B) (molecular weight) | Diol Component (C) | Catalyst in stage 2 (%) | OH number | Acid number | Viscosity mPas/75° C. |
| 1.7 | sebacic acid | — | 2000 | butane-1,4-diol | 0.002 SnCl$_2$ | 50.1 | 0.60 | 219 |
| 1.8 | adipic acid | — | 2000 (contains 10% by wt. terminal oxyethylene groups) | dodecane-1,12-diol | 0.002 SnCl$_2$ | 48.1 | 0.40 | 224 |
| 1.9 | sebacic acid 90% azelaic acid 10% | — | 1000 | hexane-1,6-diol | 0.002 SnCl$_2$ | 71.9 | 0.75 | 124 |
| 1.10 | sebacic acid | — | 1000 | butane-1,4-diol | 0.002 SnCl$_2$ | 73.8 | 0.35 | 122 |
| 1.11 | sebacic acid | 0.002 SnCl$_2$ | 2000 | butane-1,4-diol | 0.003 SnCl$_2$ | 50.1 | 0.60 | 219 |
| 1.12 | adipic acid | 0.001 SnCl$_2$ | 1000 | ethylene glycol 20% diethylene glycol 80% | 0.004 SnCl$_2$ | 71.2 | 0.60 | 116 |
| 1.13 | azelaic acid | 0.002 SnCl$_2$ | 2000 | butane-1,4-diol | 0.002 SnCl$_2$ | 41.7 | 0.85 | 197 |
| 1.14 | adipic acid | — | 2000 50% by wt. EO-containing of which 10% EO terminal | hexane-1,6-diol | 0.002 SnCl$_2$ | 43.9 | 0.85 | 188 |
| 1.15 | adipic acid | 0.002 SnCl$_2$ | mixture of 0.1 mol TMP started branched ether ($\overline{M}$: 700) with EO termination + 1 mol polypropylene diol ($\overline{M}$: 1000) | butane-1,4-diol | 0.002 SnCl$_2$ | 86.7 | 0.60 | 100 |
| 1.16 | adipic acid | — | mixture of 0.05 mol of glycerin started PO polyether ($\overline{M}$: 700) + 1 mol polypropylene diol ($\overline{M}$: 200) | hexane-1,6-diol | — | 49.0 | 0.75 | 185 |
| 1.14 | sebacic acid | | 1000 | hydroquinone bihydroxy ethyl ether | 0.002 SnCl | 71.0 | 0.90 | 490 |

EXAMPLE 3

Production of a 50-Shore-D Elastomer with Good Bearing Strength, Resistance to Wear and Simultaneously Good Low Temperature Behavior 1501 g (1 mol) of the polyetherester diol according to Example 1.1 are heated to about 140° C. and treated with 800 g (3.81 mol) of naphthylene-1,5-diisocyanate, immediately intensively stirred. After 2 minutes a vacuum is applied for degassing the melt. An NCO prepolymer is produced after 28 minutes in an exothermic reaction. A cross-linking preparation of 340 g (2.33 mol) of 1,4-3,6-dianhydrosorbitol and 16.25 mg (0.000145 mol) of triethylene diamine is stirred into this prepolymer. This reactive mixture is poured within 2 minutes into molds preheated to 110° C. and solidifies therein after about 15 minutes.

The resulting elastomer is subsequently annealed for 24 hours at 110° C. and then stored for 7 days at room temperature.

An elastomer is produced which has the properties set out in Table 2. The elastomer has a remarkably low glass transition temperature, high tear propagation resistance relatively low abrasion and good damping and modulus values.

COMPARATIVE EXAMPLE 3a

A Polyester Diol in Place of the Polyetherester Diol 1 mol (2000 g) of an anhydrous adipic acid/ethylene glycol/butane-1,4-diol (1:1 weight ratio) polyester with an average molecular weight of 2000, 3.81 mol (800 g) of naphthylene-1,5-diisocyanate and the cross-linking preparation according to Example 1 consisting of 2.33 mol (340 g) of 1,4-3,6-dianhydrosorbitol and 0.000145 mol (16.25 mg) of triethylene diamine are reacted as in Example 3. The elastomer based on polyester thereby has the property values in Table 2.

COMPARATIVE EXAMPLE 3b

A Polyether Diol in Place of the Polyetherester Diol

If 1 mol of a linear polyoxypropylene diol with an average molecular weight of 2000 is used as the high molecular weight polyhydroxyl compound, and the procedure is the same as in Example 3 and Comparative Example 3a, then an elastomer is obtained with the properties set out in Table 2.

EXAMPLE 4

Production of Elastomers with a Shore-A-Hardness of About 83

84 parts by weight of the polyetherester diol according to Example 1.5 (OH number 70.8) are treated at 125° C. with 18 parts by weight of naphthylene-1,5-diisocyanate. After 2 minutes a vacuum is applied (up to 20 mbars) for degassing and the NCO prepolymer is produced in an exothermic reaction within 23 minutes.

2 parts by weight of butane-1,4-diol are stirred into the NCO prepolymer melt and the melt is poured into a mold heated to 100° C. The composition, solidified after 15 minutes, is annealed for 24 hours at 110° C. and stored at room temperature for 7 days before measuring. For the elastomer properties see Table 2.

COMPARATIVE EXAMPLE 4a (Based on Polyester)

100 parts by weight of anhydrous polyethylene adipate (OH number 56) and 18 parts by weight of naphthylene diisocyanate are reacted to form the NCO prepolymer and chain lengthen with 2 parts by weight of butane-1,4-diol (procedure as given in Example 4). For the elastomer properties see Table 2.

COMPARATIVE EXAMPLE 4b (Based on Polyoxypropylene Diol)

The procedure is the same as in Example 4 and Comparative Example 4a and 100 parts by weight of anhydrous polyoxypropylene diol (OH number 56) are reacted with 18 parts by weight of naphthylene-1,5-diisocyanate to form an NCO prepolymer, which is chain-lengthened with 2 parts by weight of butane-1,4-diol (Procedure as in Example 4/Comparative Example 4a). For properties see Table 2.

COMPARATIVE EXAMPLES 4c and 4d

NCO prepolymers are produced as in Comparative Examples 4a and 4b and mixed with each other in the ratio:

3c:4 parts (3a) plus 1 part (3b)
3d:3 parts (3a) plus 4 parts (3b).

After chain-lengthening with butane-1,4-diol in a quantity corresponding to Example 4 and Comparative Examples (4a/4b) elastomers are obtained with the following properties, as set out in Table 2.

stirring. After about 20 seconds, the reaction mixture is poured into a trough with a teflon base heated to from 80° to 100° C. Heating to completion is carried out for about half an hour at 110° C. The sheet is cut into strips and granulated. The NCO/OH ratio in this formulation is 1.03:1. The granulate has the physical properties described in Table 3 after storing for two or three days and after injection molding on conventional injection molding machines and annealing the moldings for 15 hours at 110° C.

COMPARATIVE EXAMPLE 5a

A diol mixture consisting of a polytetrahydrofuranediol (molecular weight 1000) and a polytetrahydrofuranediol (molecular weight 2000), mixed OH number of 84, in place of the polyetherester diol from Example 5.

Formulation:
1000 g of $C_4$-ether mixture
1410 g of 4,4'-diisocyanatodiphenylmethane
7 g of Irganox ® 1010
5 g of carnauba wax
400 g of butane-1,4-diol
45 g of hexane-1,6-diol
NCO/OH ratio = 1.01:1.

The reaction and processing take place as in Example 5. The physical properties can be seen in Table 3.

COMPARATIVE EXAMPLE 5b

A diol mixture, consisting of a $C_4$-ether (molecular weight 1000) and an adipic acid-hexane-1,6-diol-polyester (molecular weight 2250) with a mixed OH number

TABLE 2

| Example No. | 3 | | | 4 | | | | |
|---|---|---|---|---|---|---|---|---|
| Comparative Example No. | | 3a | 3b | | 4a | 4b | 4c | 4d |
| Shore-A hardness (DIN 53 505) | — | — | — | 85 | 82 | 79 | 81 | 80 |
| Shore-D hardness (DIN 53 505) | 50 | 50 | 42 | — | — | — | — | — |
| Abrasion loss (DIN 53 516) in mm³ | 61 | 40 | 110 | 78 | 50 | 115 | 40 | 90 |
| Torsional vibration experiment (DIN 53 445) | | | | | | | | |
| Glass transition temperature °C. | −60 | −40 | −60 | −57 | −38 | −55 | −55 | −55 |
| Damping maximum °C. | −45 | −25 | −45 | −45 | −25 | −40 | −20 | −30 |
| shear-modulus at 20° C. MPa | 83 | 114 | 60 | 20.6 | 17 | 8 | 12 | 8 |
| Damping at 20° C. | 0.06 | 0.09 | 0.06 | 0.028 | 0.05 | 0.03 | 0.04 | 0.04 |
| shear-modulus at 110° C. MPa | 61 | 49 | 44 | 22.2 | 18 | 10 | 15 | 11 |
| Damping at 110° C. | 0.04 | 0.04 | 0.04 | 0.024 | 0.03 | 0.02 | 0.02 | 0.02 |
| Tear propagation resistance (Graves) KN/m | 82 | 101 | 42 | 35 | 40 | 16 | 53 | 27 |

EXAMPLE 5

Production of Low Phase Segregation Thermoplastic Elastomers with Very Good Cold Impact Resistance (Hardness Range 65 To 70 Shore-D)

1000 g (0.78 mol) of an anhydrous polyetherester diol (OH number 87.2) produced by esterification of adipic acid and polytetrahydrofuran diol with a molecular weight of 1000 and hexane-1,6-diol are heated to 130° C. and 1432 g (5.73 mol) of 4,4'-diisocyanato diphenylmethane (in flakes) are dissolved therein with stirring and (cooling to 80° C.) reacted for about 25 minutes to form the NCO prepolymer. 7 g of pentaerythrityl-tetrakis-3-(3,5-di-tert.-butyl-4-hydroxyphenyl)propionate (Irganox ® 1010), as well as 5 g of carnauba wax are added and stirred into the NCO prepolymer warmed to 80° C. Cross-linking is then carried out with a mixture warmed to 30° C. of 400 g (4.44 mol) of butane-1,4-diol and 40 g (0.34 mol) of hexane-1,6-diol with intensive of 94.4 is used as in Example 5 in place of the polyetherester diol.

Formulation:
1000 g of an ether diol and ester diol mixture
1448 g of 4,4'-diisocyanatodiphenylmethane
7 g of Irganox ® 1010
5 g of carnauba wax
400 g of butane-1,4-diol
40 g of hexane-1,6-diol
NCO/OH ratio = 1.02.

The method corresponds to Examples 5 and 5a. The determined values are listed in Table 3.

The product according to the invention according to Example 5 shows less phase separation than the product according to Comparative Example 5a. It is almost transparent, whereas the comparative product according to 5a has a substantial phase separation (mother-of-pearl effect).

Comparative Example 5b is likewise clear and segregation-free, but has, particularly in cold impact behavior necessary for many application purposes a very poor property level and is much less favorable than the product according to the invention.

EXAMPLE 6

In Example 6, a polyetherester diol (OH number 57.8) is used, which is produced by esterifying adipic acid with polyoxypropylene diol (molecular weight 1000) and hexane-1,6-diol. The reaction and processing in this Example 6 as well as in all following Examples 7 and Comparative Examples takes place as in Example 5.

Formulation:
1000 g of polyetherester diol
1366 g of 4,4'-diisocyanatodiphenylmethane
7 g of Irganox ® 1010
5 g of carnauba wax
400 g of butane-1,4-diol
40 g of hexane-1,6-diol
NCO/OH ratio=1.03.

The determined values are listed in Table 4.

EXAMPLE 7

A polyetherester diol (OH number 55.8) is used here, which is produced by esterifying adipic acid with polyoxypropylene diol (molecular weight 1000) and butane-1,4-diol.

Formulation:
1000 g of polyetherester diol
1364 g of 4,4'-diisocyanatodiphenylmethane
7 g of Irganox ® 1010
5 g of carnauba wax
400 g of butane-1,4-diol
40 g of hexane-1,6-diol
NCO/OH ratio=1.03.

The physical properties can be seen in Table 4.

COMPARATIVE EXAMPLE 7a

In place of the polyetherester diol, a diol mixture is used here which consists of a polyoxypropylene diol (molecular weight 1000) and an adipic acid-butane-1,4-diol polyester (molecular weight 2250) with a mixed OH number of 81.2.

Formulation:
1000 g of polyether/polyester mixture
1418 g 4,4'-diisocyanatodiphenylmethane
7 g of Irganox ® 1010
5 g of carnauba wax
400 g of butane-1,4-diol
40 g of hexane-1,6-diol
NCO/OH ratio=1.03.

The mechanical properties can be seen as a comparison in Table 4.

The products according to the invention according to Examples 6 and 7 have a clearly better cold impact behavior than the comparative example not according to the invention. In addition to the substantially improved cold properties, the products according to the invention also show an improvement in the dynamic behavior. A measurement for this, the resilience, has clearly increased.

TABLE 3

Physical properties of Example 5 and of Comparative Examples 5a and 5b

| Example No. | | 5 | | | unit of measurement |
|---|---|---|---|---|---|
| Comparative Example No. | | | 5a | 5b | |
| modulus 100% | DIN 53 404 | 27.3 | 29.8 | 26.2 | MPa |
| modulus 300% | DIN 53 404 | 46.1 | — | 44.8 | MPa |
| tensile strength | DIN 53 404 | 63.4 | 45.6 | 62.5 | MPa |
| elongation at break | DIN 53 404 | 364 | 274 | 400 | % |
| tear propagation resistance | DIN 53 515 | 157 | 162 | 160 | KN/m |
| Shore hardness A/D | DIN 53 505 | 98/65 | 98/67 | 98/66 | |
| elasticity | DIN 53 512 | 50 | 49 | 37 | % |
| abrasion | DIN 53 516 | 26 | 24 | | mm³ |
| flexural test RT | DIN 53 452 | 26.5 | 30.4 | 17.3 | MPa |
| tensile impact test −10° C. | | 168 | 104 | 67 | % |

TABLE 4

Physical properties of Examples 6 and 7 and of Comparative Example 7a

| Example No. | | 6 | 7 | | Unit of Measurement |
|---|---|---|---|---|---|
| Comparative Example No. | | | | 7a | |
| modulus 100% | DIN 53 404 | 27.4 | 27.5 | 27.7 | MPa |
| modulus 300% | DIN 53 404 | 39.1 | 41.1 | 41.6 | MPa |
| tensile strength | DIN 53 404 | 41.0 | 46.4 | 55.6 | MPa |
| elongation at break | DIN 53 404 | 312 | 328 | 363 | % |
| tear propagation resistance | DIN 53 515 | 212 | 145 | 168 | KN/m |
| Shore hardness A/D | DIN 53 505 | 98/64 | 98/68 | 98/69 | |
| elasticity | DIN 53 512 | 51 | 51 | 38 | % |
| abrasion | DIN 53 516 | 51 | 41 | | mm³ |
| flexural test RT | DIN 53 452 | 33.1 | 32.0 | 22.6 | MPa |
| tensile impact test −10° C. | | 91 | 116 | 18 | % |

EXAMPLE 8

Production of Polyether Polyester Diols

Esterification Stage 1

2 mol of adipic acid and 1 mol of polyoxytetramethylene diol with a molecular weight of 1000 (polymeg ®-1000 by the Quaker Oats Co. USA) are heated up within 3 hours to 200° C. in a nitrogen atmosphere, as described in Example 1. A vacuum is then applied and the pressure is reduced stepwise to about 20 mbars, whereby the resulting reaction water is distilled off. After a reaction duration of 4 hours, 0.003% by weight of tin(II)chloride are added. After a total of 9 hours reaction time the esterification stage I is completed (OH number 0.7). Aeration is then carried out with nitrogen.

Esterification Stage 2

2 mol of hexane-1,6-diol are added at the final temperature of stage 1, a vacuum of about 300 mbars is applied and water is distilled off over 5 hours. 0.002% by weight of tin(II)chloride are then added. The vacuum is increased to 20 mbars and the residual water is distilled off. The total duration of the esterification stage 2 is 8 hours. Aeration is then carried out with nitrogen and cooling takes place. Acid number 0.6; OH number 78.0; viscosity at 75° C. 308 mPa.s.

EXAMPLE 9

1000 g of a polyetherester diol (OH number 80.6) produced in a similar manner to example 1.1 are treated 80° C. with 443.55 g of 4,4'-diphenylmethane diisocyanate and intensively stirred for 60 minutes. The resulting NCO prepolymer is intensively stirred for 2 minutes at 80° C. with 6 g of ethylene bisstearylamide, 0.0015 g of titanium tetrabutylate and 95 g of butane-1,4-diol and is poured onto plates, heated to completion for 12 hours at 80° C. and granulated. The product can be processed without problem by injection molding. The following properties are determined on the DIN test samples:

100% modulus: 5.1 MPa
300% modulus: 10.2 MPa
tensile strength: 15.3 MPa
elongation at break: 600%
Shore hardness A: 80
Shore hardness D: 28
resilience: 32%
shrinkage: 3.2%

The product can likewise be perfectly extruded to homogeneous, non-adhesive and elastic tubular films. The thermomechanical analysis of a film sample produces a second order transition temperature Tg of $-44°$ C. The material consequently has very good low temperature properties.

COMPARATIVE EXAMPLE 9a

In place of the polyetherester diol in Example 9, a mixture, equal in weight, of polyoxypropylene diol (molecular weight 1000) and hexane-1,6-diol-polyadipate (molecular weight 2250) with a mixed OH number of 81 is used.

500 g of the polyoxypropylene diol are reacted at 80° C., firstly with 444.54 g of 4,4'-diphenylmethane diisocyanate for 60 minutes to form an NCO prepolymer, which is then intensively stirred with 500 g of the hexane-1,6-diol polyadipate, 95 g of butane-1,4-diol, 6 g of ethylene bisstearylamide and 0.0015 g of titanium tetrabutylate. The reaction product is heated for 12 hours at 80° C. and granulated. The obtained product, due to substantial adhesiveness and insufficient stability of shape (high plasticity already at room temperature), cannot be injected to form usable DIN test samples. A tubular film extruded from this material is likewise characterized by substantial adhesiveness and substantial plasticity. The thermomechanical analysis produces a second order transition temperature Tg of $-18°$ C., thus only moderate low temperature properties.

EXAMPLE 10

1000 g of a polyetherester diol (OH number 45.2, with a polyether proportion of about 80%) produced according to Example 1.2 are reacted, firstly to form NCO prepolymers at 80° C. with 364.6 g of 4,4'-diphenylmethene diisocyanate, then intensively mixed with 95 g of butane-1,4-diol, 6 g of ethylene bisstearylamide, and 0.0015 g of titanium tetrabutylate. The reacting mixture is poured onto plates, heated to completion for 12 hours at 80° C. and then granulated. The obtained product can be thermoplastically processed without problem. The following properties are determined from the given DIN test samples:

100% modulus: 5.1 MPa
300% modulus: 9.3 MPa
tensile strength: 14.7 MPa
elongation at break: 550%
Shore hardness A: 79
Shore hardness D: 27
resilience: 45%
shrinkage: 3.2%

The material can likewise be extruded without problem to a homogeneous, non-adhesive and highly resilient tubular film. The thermomechanical analysis produces a second order transition temperature Tg of $-42°$ C., thus shows very good low temperature properties.

EXAMPLE 10a

In place of the polyetherester diol in Example 10, a mixture is used consisting of 80% of polyoxypropylene diol (molecular weight 2000) and 20% of hexane-1,6-diol polyadipate (molecular weight 2250). 800 g of the polyoxypropylene diol are again first reacted to form the NCO prepolymer at 80° C. with 386.15 g of 4,4'-diphenylmethane diisocyanate, which is then intensively stirred with 200 g of the hexane-1,6-diol-polyadipate, 95 g of butane-1,4-diol, 6 g of ethylene bisstearylamide and 0.0015 g of titanium tetrabutylate. The reaction product is then heated for 12 hours at 80° C. and granulated. The obtained product shows substantial thermal decomposition during the injection molding process. The injected DIN test samples have no strength. Due to too low stability of the melt, a stable tubular film can not be extruded. The thermomechanical analysis indicates poor low temperature behavior by a second order transition temperature Tg of $-10°$ C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyetherester polyols comprising
(A) reacting
   (1) at least one polyoxyalkylene ether polyol having a molecular weight of from 400 to 10,000 with
   (2) at least one member selected from the group consisting of
       (i) dicarboxylic acids,
       (ii) di-$C_1$-$C_4$ alkyl ester of said acids,
       (iii) anhydrides of said acids, and
       (iv) mixtures thereof,
   at a molar ratio of carboxyl resp. anhydride groups to hydroxyl groups of from (1.4)/n:1 to 8/n:1 where n=1 for components (2)(i) and (2)(ii) and where n=2 for component (2)(iii), and
(B) reacting the product of step (A) with at least one aliphatic and/or cycloaliphatic diol having a molecular weight of from 62 to 399 at a hydroxyl to carboxyl equivalent ratio of at least 1.6:1.

2. The process of claim 1 wherein component (2) contains at least one additional acid component selected from the group consisting of
   (a) tricarboxylic acids,
   (b) alkyl esters of said tricarboxylic acids,
   (c) anhydrides of said tricarboxylic acids,
   (d) monocarboxylic acids, and
   (e) alkyl esters of said monocarboxylic acids,
said additional acid component being present in an amount of up to 10 equivalent % of the carboxyl groups in component (2).

3. The process of claim 1 wherein esterification catalysts are used in step (A), step (B), or both step (A) and step (B).

4. The process of claim 1, characterized in that polyoxyalkylene diols with $C_2$- and/or $C_3$-oxyalkylene radicals are used as component (1).

5. The process of claim 1, characterized in that polyoxypropylene diols, which contains up to 40% by weight of oxyethylene groups are used as component (1).

6. The process of claim 1, characterized in that component (2) is an aliphatic or cycloaliphatic based compound having from 6 to 12 carbon atoms.

7. The process according to claim 1, characterized in that component (2) is selected from the groups consisting of dicarboxylic acid esters phthalic acid, phthalic acid anhydride and mixtures thereof.

8. The process of claim 1, characterized in that the esterification stages (A) and (B) are carried out at temperatures of from 130° C. to 240° C.

9. The process of claim 1, characterized in that from 1.8 to 3 equivalents of hydroxyl groups of the aliphatic and/or cycloaliphatic diols are used per equivalent of carboxyl step (B).

10. The process of claim 1 wherein component (1) has a molecular weight of from 600 to 6000.

11. The process of claim 10 wherein component (1) has a molecular weight of from 800 to 4500.

12. A polyetherester polyol with terminal hydroxyester segments, which are bound to the polyether polyol segments produced according to the process of claim 1.

13. In a process for the preparation of a polyurethane by reacting a polyol with an isocyanate, the improvement wherein the polyol comprises the product of claim 1.

* * * * *